US012594607B2

(12) United States Patent
Katagiri

(10) Patent No.: US 12,594,607 B2
(45) Date of Patent: Apr. 7, 2026

(54) COATED CUTTING TOOL

(71) Applicant: TUNGALOY CORPORATION,
Fukushima (JP)

(72) Inventor: Takao Katagiri, Iwaki (JP)

(73) Assignee: TUNGALOY CORPORATION,
Fukushima (JP)

( * ) Notice: Subject to any disclaimer, the term of this
patent is extended or adjusted under 35
U.S.C. 154(b) by 588 days.

(21) Appl. No.: 18/311,493

(22) Filed: May 3, 2023

(65) Prior Publication Data

US 2024/0017330 A1 Jan. 18, 2024

(30) Foreign Application Priority Data

May 17, 2022 (JP) .................................. 2022-081011

(51) Int. Cl.
*B23B 27/14* (2006.01)
*C23C 28/04* (2006.01)

(52) U.S. Cl.
CPC .......... *B23B 27/148* (2013.01); *C23C 28/042*
(2013.01); *C23C 28/044* (2013.01); *B23B*
*2224/24* (2013.01); *B23B 2224/32* (2013.01)

(58) Field of Classification Search
None
See application file for complete search history.

(56) References Cited

U.S. PATENT DOCUMENTS

| | | | |
|---|---|---|---|
| 8,784,977 B2 * | 7/2014 | Miura | C23C 14/0641 51/307 |
| 2006/0246320 A1 * | 11/2006 | Kathrein | C22C 14/00 204/298.13 |
| 2015/0152561 A1 * | 6/2015 | Kang | C23C 28/027 428/698 |
| 2015/0259782 A1 * | 9/2015 | Rachbauer | C23C 14/0617 427/255.15 |
| 2018/0245201 A1 * | 8/2018 | Park | C23C 14/548 |
| 2019/0061013 A1 * | 2/2019 | Hirano | C23C 14/0641 |

FOREIGN PATENT DOCUMENTS

| | | |
|---|---|---|
| JP | 2021-030356 A | 3/2021 |
| WO | 2021/070423 A1 | 4/2021 |

* cited by examiner

*Primary Examiner* — Seth Dumbris
(74) *Attorney, Agent, or Firm* — Studebaker Brackett
PLLC

(57) ABSTRACT

A coated cutting tool including a substrate and a coating layer formed on the substrate, wherein the coating layer comprises an alternately laminated structure of a first layer and a second layer, the first layer contains a compound having a composition represented by $(Al_a M_b Ti_{1-a-b})N$ (M represents at least one of a Nb element and a Ta element, and $0.75 \leq a \leq 0.90$ and $0.00 < b \leq 0.20$ are satisfied), the second layer contains a compound having a composition represented by $(Al_c M_d Ti_{1-c-d})N$ (M represents at least one of a Nb element and a Ta element, and $0.75 \leq c \leq 0.90$ and $0.00 \leq d \leq 0.20$ are satisfied), at least one of a and c is 0.80 or more, and the average thickness of the alternately laminated structure is 0.5 μm or more and 5.0 μm or less.

20 Claims, 2 Drawing Sheets

COATED CUTTING TOOL

BACKGROUND OF THE INVENTION

Field of the Invention

The present invention relates to a coated cutting tool.

Description of Related Art

In the related art, cutting tools made of cemented carbide or cubic boron nitride (cBN) sintered body have been widely used for cutting and processing steel or the like. Among them, surface coated cutting tools containing one or two or more hard coating films such as a TiN layer, a TiAlN layer and a AlCrN layer on a surface of a cemented carbide substrate are used for various processing due to high versatility thereof.

For example, Patent Publication JP-A-2021-030356 discloses a surface coated cutting tool comprising a substrate, and a coating layer provided on the substrate, wherein the coating layer includes a first unit layer and a second unit layer; the outermost layer of the coating layer is the first unit layer; the first unit layer includes a crystal grain of cubic crystal type $Al_a(Ti_\alpha Cr_{1-\alpha})_b X_{1-a-b}N$ and a crystal grain of hexagonal crystal type $Al_a(Ti_\alpha Cr_{1-\alpha})_b X_{1-a-b}N$ ($0.5 < a < 0.8$, $0.2 \le b < 0.5$, $0 < 1-a-b < 0.1$, $0 \le \alpha \le 1$); the second unit layer includes a crystal grain of cubic crystal type $Al_c(Ti_\beta Cr_{1-\beta})_d Z_{1-c-d}N$ ($0.5 < c < 0.8$, $0.2 < d < 0.5$, $0 < 1-c-d < 0.1$, $0 \le \beta \le 1$); and the second unit layer does not include a crystal grain of hexagonal crystal type $Al_c(Ti_\beta Cr_{1-\beta})_d Z_{1-c-d}N$.

SUMMARY

Technical Problem

In recent years, lathe processing of stainless steel and the like tends to require high speed and high feed. While the cutting conditions tend to be more stringent than conventional conditions, it is required to improve the wear resistance and the fracture resistance more than before and to extend the tool life. Meanwhile, in such a surface cutting tool in Patent Publication JP-A-2021-030356, the content of Al in the coating layer is low and the hardness and oxidation resistance of the coating layer are insufficient, so that prolongation of the lifetime of the tool in hard-to-cut material processing where the cutting edge becomes high temperature may be difficult in some cases. Further, insufficient adhesiveness between the first unit layer in which the coating layer includes the hexagonal crystal and the cubic crystal, and the second unit layer in which the coating layer does not include the hexagonal crystal is concerned, and prolongation of the lifetime of the tool is required for cutting and processing (e.g., cutting and processing where the work material has an intermittent part) where chipping resistance and fracture resistance are required.

The present invention has been made in light of the above circumstances, and an object of the present invention is to provide a coated cutting tool having improved wear resistance and fracture resistance and a long tool life.

Solution to Problem

The present inventor has conducted research on extending a tool life of a coated cutting tool, and has found that when the coated cutting tool has a specific configuration, it is possible to improve wear resistance and fracture resistance, and as a result, the tool life of the coated cutting tool can be extended. Thus, the invention has been completed.

That is, the gist of the present invention is as follows.

[1] A coated cutting tool comprising a substrate and a coating layer formed on the substrate, wherein, the coating layer has an alternately laminated structure of a first layer and a second layer;

the first layer contains a compound having a composition represented by a following formula (1):

$$(Al_a M_b Ti_{1-a-b})N \tag{1}$$

wherein M represents at least one of a Nb element and a Ta element; a is an atomic ratio of an Al element to a total of the Al element, an element represented by M, and a Ti element, and satisfies $0.75 \le a \le 0.90$; and b is an atomic ratio of the element represented by M to the total of the Al element, the element represented by M, and the Ti element, and satisfies $0.00 \le b \le 0.20$;

the second layer contains a compound having a composition represented by a following formula (2), the compound contained in the second layer being different from the compound contained in the first layer:

$$(Al_c M_d Ti_{1-c-d})N \tag{2}$$

wherein M represents at least one of a Nb element and a Ta element; c is an atomic ratio of an Al element to a total of the Al element, an element represented by M, and a Ti element, and satisfies $0.75 \le c \le 0.90$, and d is an atomic ratio of the element represented by M to the total of the Al element, the element represented by M, and the Ti element, and satisfies $0.00 \le d \le 0.20$;

at least one of a and c is 0.80 or more; and an average thickness of the alternately laminated structure is 0.5 μm or more and 5.0 μm or less.

[2] The coated cutting tool according to [1], wherein where a sum of diffraction peak intensities of a cubic crystal (111) plane and a cubic crystal (200) plane is denoted by $I_{cub}$ and a sum of diffraction peak intensities of a hexagonal crystal (110) plane and a hexagonal crystal (100) plane is denoted by $I_{hex}$ in X-ray diffraction of the alternately laminated structure, $I_{hex}/I_{cub}$ is 0.00 or more and 0.40 or less.

[3] The coated cutting tool according to [1] or [2], wherein an average composition of the entire compound of the alternately laminated structure is represented by a following formula (3):

$$(Al_e M_f Ti_{1-e-f})N \tag{3}$$

wherein M represents at least one of a Nb element and a Ta element, e is an atomic ratio of an Al element to a total of the Al element, an element represented by M, and a Ti element, and satisfies $0.80 \le e \le 0.90$; and f is an atomic ratio of the element represented by M to the total of the Al element, the element represented by M, and the Ti element.

[4] The coated cutting tool according to [3], wherein f satisfies $0.00 < f \le 0.10$ in the formula (3).

[5] The coated cutting tool according to any one of [1] to [4], wherein a and c satisfy $0.00 \le |a-c| \le 0.05$.

[6] The coated cutting tool according to any one of [1] to [5], wherein an average thickness per layer of the first layer is 2 nm or more and 50 nm or less; and an average thickness per layer of the second layer is 2 nm or more and 50 nm or less.

Advantageous Effects of Invention

According to the present invention, it is possible to provide a coated cutting tool having improved wear resistance and fracture resistance and a long tool life.

DETAILED DESCRIPTION

Figure 1:
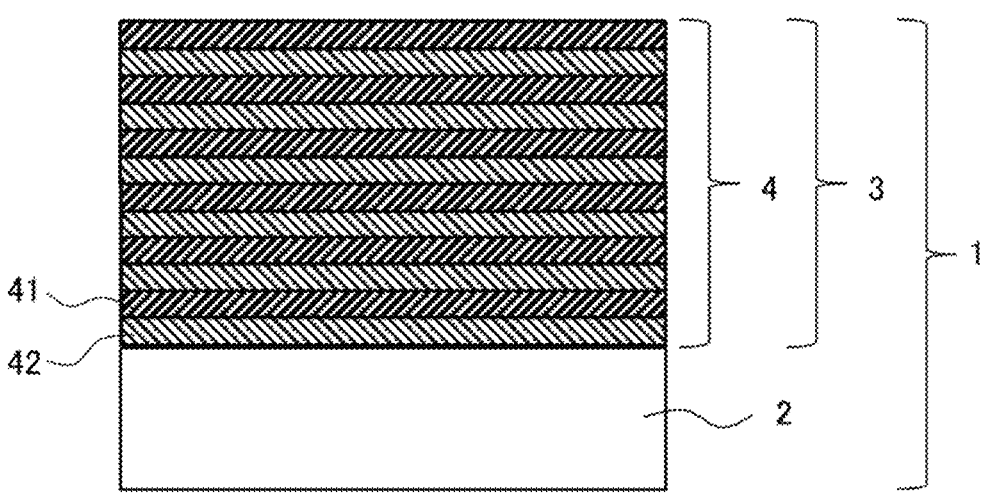
FIG. 1 is a schematic view showing an example of a coated cutting tool of the present invention.

Hereinafter, an embodiment for implementing the present invention (hereinafter, simply referred to as "the present embodiment") will be described in detail, but the present invention is not limited to the following embodiment. The present invention can be modified in various ways without departing from the gist thereof. In the drawings, the same elements are designated by the same reference numerals, and repeated description will be omitted. Further, unless otherwise specified, a positional relationship such as up, down, left, and right is based on a positional relationship shown in the drawing. Furthermore, a dimensional ratio in the drawing is not limited to a ratio shown.

The coated cutting tool of the present embodiment is a coated cutting tool including a substrate and a coating layer formed on the substrate, wherein the coating layer comprises an alternately laminated structure of a first layer and a second layer, the first layer contains a compound having a composition represented by a following formula (1):

$$(Al_aM_bTi_{1-a-b})N \tag{1}$$

In the formula (1), M represents at least one of a Nb element and a Ta element; a is an atomic ratio of an Al element to a total of the Al element, an element represented by M, and a Ti element, and satisfies $0.75 \le a \le 0.90$, and b is an atomic ratio of the element represented by M to the total of the Al element, the element represented by M, and the Ti element, and satisfies $0.00 < b \le 0.20$;

the second layer contains a compound having a composition represented by a following formula (2), the compound contained in the second layer being different from the compound contained in the first layer:

$$(Al_cM_dTi_{1-c-d})N \tag{2}$$

(in the formula (2), M represents at least one of a Nb element and a Ta element; c is an atomic ratio of an Al element to a total of the Al element, an element represented by M, and a Ti element, and satisfies $0.75 \le c \le 0.90$; and d is an atomic ratio of the element represented by M to the total of the Al element, the element represented by M, and the Ti element and satisfies $0.00 \le d \le 0.20$;

at least one of a and c is 0.80 or more; and an average thickness of the alternately laminated structure is 0.5 μm or more and 5.0 μm or less.

Factors why such a coated cutting tool has improved oxidation resistance and wear resistance, and a long tool life are not clear in detail, but it is estimated as follows. However, the factors are not limited thereto.

When a in $(Al_aM_bTi_{1-a-b})N$ which is the composition represented by the formula (1) in the first layer which forms the alternately laminated structure is 0.75 or more, the hardness is increased and the oxidation resistance is improved, so that the wear resistance of the coated cutting tool is excellent. Meanwhile, when a is 0.90 or less, the formation of hexagonal crystals is suppressed, so that the reduction of the hardness can be suppressed and the wear resistance is excellent. When b is more than 0.00, at least one of the Nb element and the Ta element is contained, so that high toughness is achieved and the chipping resistance and fracture resistance of the coated cutting tool are improved. Further, when b is 0.20 or less, the oxidation resistance is improved, a high hardness is achieved, and the wear resistance is excellent by increasing the content of Al, or the adhesiveness of the coating layer is improved and the peeling of the coating layer is suppressed by increasing the content of Ti, so that the fracture resistance is excellent.

Then, c in $(Al_cM_dTi_{1-c-d})N$ which is the composition represented by the formula (2) is 0.75 or more in the second layer of the alternately laminated structure, the hardness is increased and the oxidation resistance is improved, so that the wear resistance of the coated cutting tool is excellent. Meanwhile, when c is 0.90 or less, the formation of hexagonal crystals is suppressed, so that the reduction of the hardness can be suppressed. When d is 0.00 or more in the formula (2), a high toughness is achieved, and the chipping resistance and fracture resistance of the coated cutting tool are improved. Further, when d is 0.20 or less, the oxidation resistance is improved, a high hardness is achieved, and the wear resistance is excellent by increasing the content of Al, or the adhesiveness of the coating layer is improved and the peeling of the coating layer is suppressed by increasing the content of Ti, so that the fracture resistance is excellent.

Since the coating layer has such an alternately laminated structure of the first layer and the second layer, the propagation of the cracks to the substrate occurring during processing can be suppressed, so that the fracture resistance of the coated cutting tool is improved.

Further, when at least one of a and c in the formulas (1) and (2) is 0.80 or more, the content of Al in the coating layer is increased, and the oxidation resistance and wear resistance of the coated cutting tool are improved. When the average thickness of the entire alternately laminated structure is 0.5 μm or more, the chipping resistance and fracture resistance of the coated cutting tool are improved, and when the average thickness of the entire alternately laminated structure is 5.0 μm or less, the peeling of the coating layer can be suppressed, so that the chipping resistance and fracture resistance of the coated cutting tool are improved. Combined with these effects, the coated cutting tool of the present embodiment has improved wear resistance and fracture resistance, and a long tool life.

The coated cutting tool of the present embodiment includes a substrate and a coating layer formed on the surface of the substrate. The substrate used in this embodiment is not particularly limited as long as it can be used for a coated cutting tool. Examples of such a substrate include a cemented carbide, a cermet, a ceramic, a cubic boron nitride sintered body, a diamond sintered body, and high-speed steel. Among them, the substrate is further preferably any one of a cemented carbide, a cermet, a ceramic, and a cubic boron nitride sintered body, because more excellent wear resistance and fracture resistance of the coated cutting tool can be realized.

In the coated cutting tool of the present embodiment, the average thickness of the entire coating layer is preferably 0.5 μm or more and 9.0 μm or less. In the coated cutting tool of the present embodiment, when the average thickness of the entire coating layer is 0.5 μm or more, the chipping resistance, fracture resistance, and/or wear resistance of the coated cutting tool are improved. In the coated cutting tool of the present embodiment, when the average thickness of the entire coating layer is 9.0 μm or less, the chipping resistance and fracture resistance is improved mainly because the peeling of the coating layer is suppressed. From the same viewpoint, the average thickness of the entire coating layer is more preferably 1.0 μm or more and 8.0 μm or less, and further preferably 2.0 μm or more and 7.0 μm or less.

First Layer

In the coated cutting tool of the present embodiment, the first layer is a compound layer containing a compound having a composition represented by the following formula (1). In the following formula (1), M represents at least one of the Nb element and the Ta element, a is the atomic ratio of the Al element to the total of the Al element, the element represented by M, and the Ti element and satisfies $0.75 \leq a \leq 0.90$, and b is the atomic ratio of the element represented by M to the total of the Al element, the element represented by M, and the Ti element and satisfies $0.00 < b \leq 0.20$.

$$(\text{Al}_a\text{M}_b\text{Ti}_{1-a-b})\text{N} \tag{1}$$

In the first layer which forms the alternately laminated structure, when a in $(\text{Al}_a\text{M}_b\text{Ti}_{1-a-b})\text{N}$ is 0.75 or more, the hardness is increased, and the oxidation resistance is improved, so that the wear resistance of the coated cutting tool is excellent. Meanwhile, when a is 0.90 or less, the formation of hexagonal crystals is suppressed, so that the reduction of the hardness is suppressed and the wear resistance is excellent. From the same viewpoint, a in $(\text{Al}_a\text{M}_b\text{Ti}_{1-a-b})\text{N}$ is preferably 0.78 or more and 0.88 or less, and more preferably 0.80 or more and 0.85 or less.

When b is more than 0.00 in $(\text{Al}_a\text{M}_b\text{Ti}_{1-a-b})\text{N}$, at least one of the Nb element and the Ta element is contained, so that high toughness is achieved and the chipping resistance and fracture resistance of the coated cutting tool are improved. Meanwhile, when b is 0.20 or less, the oxidation resistance is improved, a high hardness is achieved, and the wear resistance is excellent by increasing the content of Al, or the adhesiveness of the coating layer is improved and the peeling of the coating layer is suppressed by increasing the content of Ti, so that the fracture resistance is improved. From the same viewpoint, b in $(\text{Al}_a\text{M}_b\text{Ti}_{1-a-b})\text{N}$ is preferably 0.02 or more and 0.12 or less, and more preferably 0.04 or more and 0.08 or less.

In the formula (1), the element represented by M is at least one of the Nb element and the Ta element. The term "at least one of the Nb element and the Ta element" includes a case where either one of Nb or Ta is contained, and a case where both Nb and Ta are contained. When Nb is contained, the formation of hexagonal crystals is suppressed as compared with the case of containing Ta, so that the reduction of the hardness tends to be suppressed. From such a viewpoint, the element represented by M in the formula (1) preferably contains more Nb than Ta, and is further preferably Nb.

Further, in the present embodiment, when the composition of each compound layer is expressed as, for example, $(\text{Al}_{0.75}\text{M}_{0.05}\text{Ti}_{0.20})\text{N}$, it means that the atomic ratio of the Al element to the total of the Al element, the element represented by M, and the Ti element Al element is 0.75, the atomic ratio of the element represented by M to the total of the Al element, the element represented by M, and the Ti element is 0.05, and the atomic ratio of the Ti element to the total of the Al element, the element represented by M, and the Ti element is 0.20. That is, it means that the amount of the Al element is 75%, the amount of the element represented by M is 5%, and the amount of the Ti element is 20% to the total of the Al element, the element represented by M, and the Ti element.

[Second Layer]

In the coated cutting tool of the present embodiment, the second layer is a compound layer containing a compound having a composition represented by the following formula (2). In the following formula (2), the element represented by M represents at least one of the Nb element and the Ta element, c is an atomic ratio of the Al element to the total of the Al element, the element represented by M, and the Ti element and satisfies $0.75 \leq c \leq 0.90$, and d is the atomic ratio of the element represented by M to the total of the Al element, the element represented by M, and the Ti element and satisfies $0.00 \leq d \leq 0.20$. The second layer contains a compound having a different composition from that of the compound contained in the first layer.

$$(\text{Al}_c\text{M}_d\text{Ti}_{1-c-d})\text{N} \tag{2}$$

In the second layer which forms the alternately laminated structure, when c in $(\text{Al}_c\text{M}_d\text{Ti}_{1-c-d})\text{N}$ is 0.75 or more, the hardness is increased, and the oxidation resistance is improved, so that the wear resistance of the coated cutting tool is excellent. Meanwhile, when c is 0.90 or less, the formation of hexagonal crystals is suppressed, so that the reduction of the hardness can be suppressed. From the same viewpoint, c in $(\text{Al}_c\text{M}_d\text{Ti}_{1-c-d})\text{N}$ is preferably or more and 0.88 or less, and more preferably 0.80 or more and 0.85 or less.

When d is 0.00 or more in $(\text{Al}_c\text{M}_d\text{Ti}_{1-c-d})\text{N}$, a high toughness is achieved, and the chipping resistance and fracture resistance of the coated cutting tool are improved. Meanwhile, when d is 0.20 or less, the oxidation resistance is improved, a high hardness is achieved, and the wear resistance is excellent by increasing the content of Al, or the adhesiveness of the coating layer is improved, the peeling of the coating layer is suppressed by increasing the content of Ti, so that the fracture resistance is improved. From the same viewpoint, d in $(\text{Al}_c\text{M}_d\text{Ti}_{1-c-d})\text{N}$ is preferably 0.02 or more and or less, and more preferably 0.04 or more and 0.10 or less.

In the formula (2), the element represented by M is at least one of the Nb element and the Ta element. It includes the case where either one of Nb or Ta is contained, and the case where both Nb and Ta are contained. When Nb is contained, the formation of hexagonal crystals is suppressed as compared with the case of containing Ta, so that the reduction of the hardness tends to be suppressed. From such a viewpoint, the element represented by M in the formula (2) preferably contains more Nb than Ta, and is further preferably Nb.

Further, when the lower layer described below is not formed in the coated cutting tool of the present embodiment, the layer formed on the substrate is not particularly limited. When the content of Al is different between the first layer and the second layer, the layer having a lower content of Al is preferably formed on the surface of the substrate first, and when the content of Al is the same between them, the layer having a lower content of the element represented by M and a higher content of Ti is preferably formed on the surface of the substrate first. In the coated cutting tool of the present embodiment, when the layers are formed on the surface of the substrate as described above, the adhesiveness between the substrate and the coating layer tends to be improved.

Alternately Laminated Structure

In the coating layer, the coated cutting tool of the present embodiment has an alternately laminated structure in which the first layer and the second layer are alternately laminated. When the coated cutting tool of the present embodiment has the alternately laminated structure in which the first layer and the second layer are alternately laminated in the coating layer, the propagation of the cracks to the substrate occurring during processing can be suppressed, so that the fracture resistance is improved. Further, when in the alternately laminated structure, the composition of the first layer is $(Al_aM_bTi_{1-a-b})N$ which satisfies the formula (1) and the composition of the second layer is $(Al_cM_dTi_{1-c-d})N$ which satisfies the formula (2), a large amount of Al is contained over the entire alternately laminated structure, so that the hardness of the entire coating layer is improved and the wear resistance of the coated cutting tool is improved.

In the coating layer used in the present embodiment, at least one of a in the formula (1) and c in the formula (2) is 0.80 or more. When at least one of a and c is 0.80 or more, the content of Al in the coating layer is increased, so that the oxidation resistance and wear resistance of the coated cutting tool are improved. From the same viewpoint, at least one of a in the formula (1) and c in the formula (2) is preferably 0.82 or more, and more preferably 0.85 or more.

In the coating layer used in the present embodiment, the absolute value of the difference between a in the formula (1) and c in the formula (2), $(|a-c|)$ is preferably 0.00 or more and 0.05 or less. When the value of $|a-c|$ is 0.05 or less, a large amount of Al is contained over the entire alternately laminated structure, so that the hardness is increased and the oxidation resistance is improved. Thus, not only the wear resistance of the coated cutting tool is improved, but also the adhesiveness between the first layer and the second layer is improved, and the fracture resistance tends to be excellent. From the same viewpoint, $|a-c|$ is more preferably 0.00 or more and 0.04 or less, and further preferably 0.00 or more and 0.02 or less.

In the coating layer used in the present embodiment, the absolute value of the difference between b in the formula (1) and d in the formula (2), $(|b-d|)$ is not particularly limited, but may be, for example, 0.00 or more and less than 0.20. From the viewpoint of improving the adhesiveness between the first layer and the second layer and suppressing the peeling of the coating layer, the value of $|b-d|$ is preferably 0.00 or more and 0.15 or less, more preferably 0.00 or more and 0.10 or less, and further preferably 0.00 or more and 0.08 or less.

The coated cutting tool of the present embodiment preferably has a number of repetitions of the first layer and the second layer of 2 times or more, more preferably 5 times or more and 1250 times or less, further preferably 10 times or more and 1000 times or less, and still further preferably 30 times or more and 750 times or less in the alternately laminated structure. When the number of repetitions of the first layer and the second layer falls within the above range, the fracture resistance tends to be further improved.

In the present embodiment, when one first layer and one second layer are formed, the "number of repetitions" is 1 time.

In the coated cutting tool of the present embodiment, the average composition of the alternately laminated structure is preferably represented by the following formula (3).

$$(Al_eM_fTi_{1-e-f})N \tag{3}$$

Here, M represents at least one of the Nb element and the Ta element, e is the atomic ratio of the Al element to the total of the Al element, the element represented by M, and the Ti element, and satisfies $0.80 \leq e \leq 0.90$, and f is the atomic ratio of the element represented by M to the total of the Al element, the element represented by M, and the Ti element, and satisfies $0.00 < f \leq 0.10$.

When e is 0.80 or more in the formula (3), the hardness is increased, the oxidation resistance is improved, and the wear resistance of the coated cutting tool tends to be excellent. Meanwhile, when e is 0.90 or less, the formation of hexagonal crystals is suppressed, so that the reduction of the hardness is suppressed, and the wear resistance tends to be excellent. From the same viewpoint, e is more preferably 0.81 or more and 0.88 or less, and further preferably 0.82 or more and 0.85 or less.

When f is more than 0.00 in the formula (3), at least one of the Nb element and the Ta element is contained, so that a high toughness is achieved, and the fracture resistance of the coated cutting tool is improved. Meanwhile, when f is 0.10 or less, the oxidation resistance is improved, a high hardness is achieved, and the wear resistance is excellent by increasing the content of Al, or the adhesiveness of the coating layer is improved, the peeling of the coating layer is suppressed by increasing the content of Ti, so that the fracture resistance is improved. From the same viewpoint, f is more preferably 0.01 or more and 0.09 or less, and further preferably 0.02 or more and 0.05 or less.

In the coated cutting tool of the present embodiment, the average thickness per layer of each of the first layer and the second layer is preferably 2 nm or more and 100 nm or less. When the average thickness per layer of each of the first layer and the second layer in the alternately laminated structure is 2 nm or more, the phenomenon of the propagation of the cracks to the substrate occurring during processing can be suppressed in the alternately laminated structure, and to further improve the hardness, the fracture resistance and wear resistance of the coated cutting tool tend to be further improved. When the average thickness per layer of each of the first layer and the second layer is 2 nm or more, the formation of a uniform compound layer is facilitated, which is an advantage in the manufacture.

Meanwhile, when the average thickness per layer of each of the first layer and the second layer in the alternately laminated structure is 100 nm or less, the adhesiveness between the first layer and the second layer is improved, the fracture of the tool due to the peeling of the coating layer is suppressed, so that the wear resistance of the coated cutting tool tends to be improved.

From the same viewpoint as above, the average thickness per layer of each of the first layer and the second layer in the alternately laminated structure is more preferably 2 nm or more and 50 nm or less, further preferably 5 nm or more and 50 nm or less, and still further preferably 5 nm or more and 30 nm or less.

The average thicknesses per layer of the first layer and the second layer may be the same or different from each other.

In the coated cutting tool of the present embodiment, the average thickness of the entire alternately laminated structure is 0.5 μm or more and 5.0 μm or less. When the average thickness of the entire alternately laminated structure is 0.5 μm or more, the chipping resistance and fracture resistance of the coated cutting tool is improved. When the average thickness of the entire alternately laminated structure is 5.0 μm or less, the peeling of the coating layer can be suppressed, so that the chipping resistance and fracture resistance of the coated cutting tool are improved. From the same viewpoint, the average thickness of the alternately laminated structure is preferably 1.0 μm or more and 4.5 μm or less, and more preferably 1.5 μm or more and 4.0 μm or less.

In the coated cutting tool of the present embodiment, when the sum of diffraction peak intensities of a cubic crystal (111) plane and a cubic crystal (200) plane is denoted by $I_{cub}$ and the sum of diffraction peak intensities of a hexagonal crystal (110) plane and a hexagonal crystal (100) plane is denoted by $I_{hex}$ in the X-ray diffraction of the alternately laminated structure, $I_{hex}/I_{cub}$ may be, for example, 0.00 or more and 0.48 or less, but is preferably 0.00 or more and 0.40 or less.

When $I_{hex}/I_{cub}$ is 0.48 or less, the formation of hexagonal crystals is suppressed, so that the hardness is increased, and the wear resistance of the coated cutting tool tends to be further improved. From the same viewpoint, in the alternately laminated structure, $I_{hex}/I_{cub}$ is more preferably 0.00 or more and 0.35 or less, further preferably 0.00 or more and 0.24 or less, and still further preferably 0.00 or more and 0.12 or less.

The peak intensity of each plane index in the coating layer used in the present embodiment can be calculated by using a commercially available X-ray diffractometer. For example, the above peak intensity of each plane index can be measured by using an X-ray diffractometer RINT TTR III (product name) manufactured by Rigaku Corporation and performing X-ray diffraction measurement with a 2θ/θ focused optical system using Cu-Kα rays under the following conditions. Here, the measurement conditions are output: 50 kV, 250 mA, incident side solar slit: 5°, divergent vertical slit: 2/3°, divergent vertical limiting slit: 5 mm, scattering slit: 2/3°, light receiving side solar slit: 5°, light receiving slit: 0.3 mm, BENT monochromator, light receiving monochrome slit: 0.8 mm, sampling width: 0.01°, scan speed: 4°/min, and 2θ measurement range: 20° to 70°. When obtaining the above peak intensity of each plane index from the X-ray diffraction pattern, the analysis software provided with the X-ray diffractometer may be used. In the analysis software, each peak intensity can be obtained by performing background processing and Kα2 peak removal using a cubic approximation, and performing profile fitting using the Pearson-VII function. Specifically, each peak intensity can be measured and calculated by the method described in Examples described below.

Figure 2:
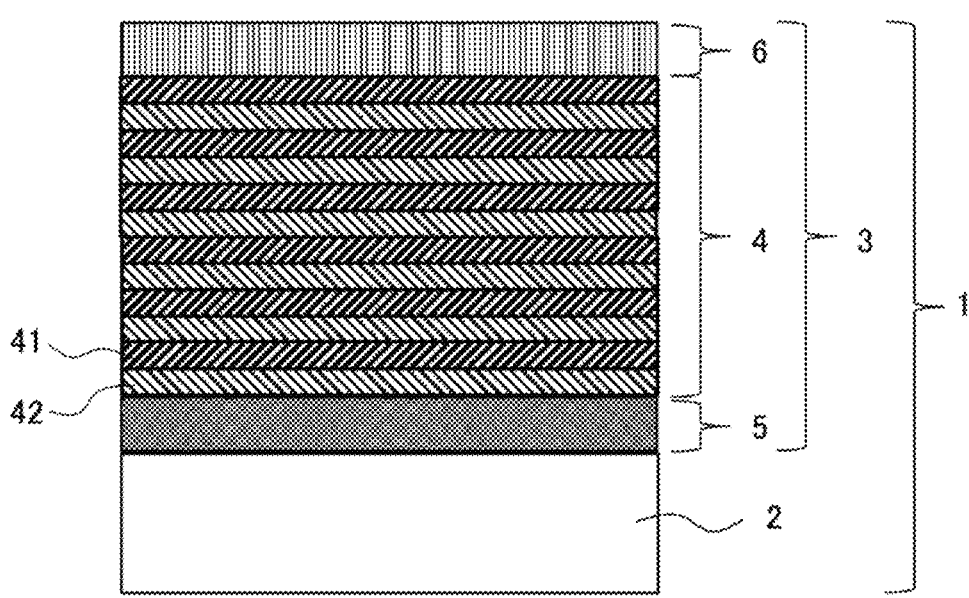
FIG. 2 is a schematic view showing another example of a coated cutting tool of the present invention.

FIG. 1 is a schematic cross-sectional view showing an example of a coated cutting tool of the present embodiment. The coated cutting tool 1 shown in FIG. 1 includes a substrate 2 and a coating layer 3 formed on the surface of the substrate 2. The coating layer 3 has an alternately laminated structure 4 in which the first layer 41 and the second layer 42 are alternately formed from the substrate 2 side. In the alternately laminated structure 4 shown in FIG. 1, the alternate formation of the first layer 41 and the second layer 42 is repeated 6 times. In addition, FIG. 2 is a schematic cross-sectional view showing another example of a coated cutting tool of the present embodiment. The coated cutting tool 1 shown in FIG. 2 has a lower layer 5 between the substrate 2 and the alternately laminated structure 4 that includes the first layer 41 and the second layer 42, and has an upper layer 6 on the surface opposite to the substrate 2 in the alternately laminated structure 4.

Lower Layer

The coating layer used in the present embodiment may be composed of only the alternately laminated structure of the first layer and the second layer, but it is preferable to include a lower layer between the substrate and the alternately laminated structure including the first layer and the second layer. The adhesiveness between the substrate and the coating layer tends to be further improved by having the lower layer. From the same viewpoint, the lower layer is preferably a single layer or a multilayer of a compound composed of at least one element selected from the group consisting of Ti, Zr, Hf, V, Nb, Ta, Cr, Mo, W, Al, Si, and Y and at least one element selected from the group consisting of C, N, O, and B (provided that, the compound composed of the composition represented by the formula (1) and the compound composed of the composition represented by the formula (2) are excluded), more preferably a single layer or a multilayer of a compound composed of at least one element selected from the group consisting of Ti, Nb, Cr, Mo, W, Al, Si, and Y and at least one element selected from the group consisting of C, N, and B, and particularly preferably a single layer or a multilayer of a compound composed of at least one element selected from the group consisting of Ti, Cr, Al, and Si, and at least one element selected from the group consisting of C and N. The specific compound included in the lower layer is not particularly limited, and examples thereof include CrN, TiAlN, TiCN, and TiAlSiN.

In the present embodiment, it is preferable that the average thickness of the lower layer be 0.2 μm or more and 2.0 μm or less because the adhesion between the substrate and the coating layer tends to be further improved. From the same viewpoint, the average thickness of the lower layer is more preferably 0.3 μm or more and 1.8 μm or less, and further preferably 0.5 μm or more and 1.5 μm or less.

Upper Layer

The coating layer used in the present embodiment may be composed of only the alternately laminated structure of the first layer and the second layer, but may include an upper layer on the surface opposite to the substrate in the alternately laminated structure. The upper layer is preferably a single layer or a multilayer of a compound composed of at least one element selected from the group consisting of Ti, Zr, Hf, V, Nb, Ta, Cr, Mo, W, Al, Si, and Y and at least one element selected from the group consisting of C, N, O, and B (provided that, the compound composed of the composition represented by the formula (1) and the compound composed of the composition represented by the formula (2) are excluded). When the coating layer has an upper layer which is a single layer or a multilayer of the compound as described above, the wear resistance tends to be more excellent. From the same viewpoint, the upper layer more preferably includes a compound composed of at least one element selected from the group consisting of Ti, Nb, Cr, Mo, W, Al, Si, and Y and at least one element selected from the group consisting of C, N, and B, and particularly preferably contains a compound composed of N and at least one element selected from the group consisting of Ti, Nb, Mo, Al, and Si. The specific compound included in the upper layer is not particularly limited, and examples thereof include TiN, TiAlN, TiSiN, TiMoN, and NbN.

In the coating layer used in the present embodiment, the average thickness of the upper layer is preferably 0.2 μm or more and 2.0 μm or less. When the average thickness of the upper layer is 0.2 μm or more, the wear resistance of the coated cutting tool tends to be improved. When the average thickness of the upper layer is 2.0 μm or less, the fracture resistance of the coated cutting tool tends to be improved mainly because the peeling of the coating layer is suppressed. From the same viewpoint, the average thickness of the upper layer is more preferably 0.3 μm or more and 1.8 μm or less, and further preferably 0.5 μm or more and 1.5 μm or less.

Method for Manufacturing Coating Layer

A method of manufacturing the coating layer in the coated cutting tool of the present embodiment is not particularly limited, and examples thereof include a physical vapor deposition method such as an ion plating method, an arc ion plating method, a sputtering method, and an ion mixing method. Use of the physical vapor deposition method for forming the coating layer is preferred because a sharp edge can be formed. Among them, the arc ion plating method is more preferred because the adhesion between the coating layer and the substrate is more excellent.

Method for Manufacturing Coated Cutting Tool

A method of manufacturing the coated cutting tool of the present embodiment will be described below with reference to specific examples. The method of manufacturing the coated cutting tool of the present embodiment is not particularly limited as long as a configuration of the coated cutting tool can be implemented.

First, a substrate processed into a tool shape is housed in a reaction vessel of a physical vapor deposition device, and a metal evaporation source is disposed in the reaction vessel. Then, the inside of the reaction vessel is evacuated until a pressure thereof is a vacuum of $1.0\times10^{-2}$ Pa or less, and the temperature of the substrate is controlled to a temperature of $200°$ C. to $700°$ C. by a heater in the reaction vessel. After heating, Ar gas is introduced into the reaction vessel to make the pressure in the reaction vessel to 0.5 Pa to 5.0 Pa. In an Ar gas atmosphere with a pressure of 0.5 Pa to 5.0 Pa, a bias voltage of $-500$ V to $-350$ V is applied to the substrate, a current of 40 A to 50 A is flowed through a tungsten filament in the reaction vessel, and the surface of the substrate is subjected to an ion bombardment treatment with Ar gas. After the surface of the substrate is subjected to the ion bombardment treatment, the inside of the reaction vessel is evacuated until the pressure is a vacuum of $1.0\times10^{-2}$ Pa or less.

When forming the lower layer used in the present embodiment, the substrate is controlled until the temperature reaches $250°$ C. to $500°$ C. After controlling, gas is introduced into the reaction vessel to make the pressure inside the reaction vessel to 3.0 Pa to 8.0 Pa. The gas is, for example, $N_2$ gas when the lower layer is formed of a compound containing at least one of N and B, and at least one element selected from the group consisting of Ti, Zr, Hf, V, Nb, Ta, Cr, Mo, W, Al, Si, and Y. When the lower layer is formed of a compound containing N, C, and at least one element selected from the group consisting of Ti, Zr, Hf, V, Nb, Ta, Cr, Mo, W, Al, Si, and Y, the gas is, for example, a mixed gas of $N_2$ gas and $C_2H_2$ gas.

A volume ratio of the mixed gas is not particularly limited, and may be, for example, $N_2$ gas:$C_2H_2$ gas=95:5 to 85:15. Next, it is preferable that a bias voltage of $-200$ V to $-40$ V be applied to the substrate, and the metal evaporation source corresponding to metal and non-metal components of each layer be evaporated by an arc discharge of an arc current of 80 A to 120 A to form the lower layer. For example, when the lower layer containing at least one of the B element and the C element, a metal evaporation source containing the B element and/or the C element may be used, if necessary.

When forming the second layer used in the present embodiment, the temperature of the substrate is controlled to be $200°$ C. to $300°$ C., $N_2$ gas is introduced into the reaction vessel, and the pressure inside the reaction vessel is set to 8.0 Pa to 12.0 Pa. After that, it is preferable that a bias voltage of $-400$ V to $-200$ V be applied to the substrate, and the metal evaporation source corresponding to a metal component of the second layer be evaporated by an arc discharge of an arc current of 80 A to 120 A to form the second layer.

When forming the first layer used in the present embodiment, the temperature of the substrate is controlled to be $200°$ C. to $300°$ C. It is preferable to set the temperature of the substrate to the same temperature as the temperature of the substrate when the second layer is formed, because the second layer and the first layer can be continuously formed. After controlling the temperature, $N_2$ gas is introduced into the reaction vessel, and the pressure in the reaction vessel is set to 8.0 Pa to 12.0 Pa. Next, it is preferable that a bias voltage of $-400$ V to $-200$ V may be applied to the substrate, and the metal evaporation source corresponding to a metal component of the first layer may be evaporated by an arc discharge of an arc current of 80 A to 120 A to form the first layer.

In order to form an alternately laminated structure in which first layers and second layers are alternately laminated in two or more layers, respectively, it is preferable that the metal evaporation source corresponding to the metal component of the first layer and the metal evaporation source corresponding to the metal component of the second layer be alternately evaporated under the above-described conditions by an arc discharge to form each layer alternately. By adjusting each arc discharge time of the metal evaporation source corresponding to the metal component of the first layer and the metal evaporation source corresponding to the metal component of the second layer, the thickness of each layer constituting the alternately laminated structure can be controlled.

In order to set the composition of the entire compound in the alternately laminated structure used in the present embodiment to a predetermined value, the thickness of each layer in the alternately laminated structure and the ratio of the metal element in each layer may be adjusted in the aforementioned process of forming the alternately laminated structure.

In order to set the X-ray diffraction intensity ratio, $I_{hex}/I_{cub}$ in the coating layer used in the present embodiment to a predetermined value, the temperature of the substrate, the bias voltage, or the atomic ratio of each metal element may be adjusted in the process of forming the aforementioned alternately laminated structure. More specifically, when the temperature of the substrate is lowered or the negative bias voltage is increased (direction away from zero) in the process of forming the alternately laminated structure, $I_{hex}/I_{cub}$ tends to be smaller. Further, when the atomic ratio of the Al element is reduced and the atomic ratio of the element represented by M (at least one of the Nb element and the Ta element) or the Ti element is increased in the process of forming the alternately laminated structure, $I_{hex}/I_{cub}$ tends to be smaller. Further, when two elements, that is, the Nb element and the Ta element are used as the M element in the process of forming the alternately laminated structure and the proportion of the Nb element in the M element is increased, $I_{hex}/I_{cub}$ tends to be smaller.

When forming the upper layer used in the present embodiment, that the upper layer may be formed under the same manufacturing conditions as those of the lower layer described above. That is, first, the temperature of the substrate is controlled until the temperature thereof reaches $200°$ C. to $500°$ C. After controlling, gas is introduced into the reaction vessel to make the pressure in the reaction vessel to 3.0 Pa to 8.0 Pa. The gas is, for example, $N_2$ gas when the upper layer is formed of a compound containing at least one of N and B, and at least one element selected from the group consisting of Ti, Zr, Hf, V, Nb, Ta, Cr, Mo, W, Al, Si, and Y. When the upper layer is formed of a compound containing N, C, and at least one element selected from the group consisting of Ti, Zr, Hf, V, Nb, Ta, Cr, Mo, W, Al, Si, and Y, the gas is, for example, a mixed gas of $N_2$ gas and $C_2H_2$ gas. A volume ratio of the mixed gas is not particularly limited, and may be, for example, $N_2$ gas:$C_2H_2$ gas=95:5 to 85:15. Next, it is preferable that a bias voltage of –200 V to –40 V be applied to the substrate, and the metal evaporation source corresponding to metal and non-metal components of each layer be evaporated by an arc discharge of an arc current of 80 A to 120 A to form the upper layer. For example, when the upper layer containing at least one of the B element and the C element, a metal evaporation source containing the B element and/or the C element may be used, if necessary.

The thickness of each layer forming the coating layer in the coated cutting tool of the present embodiment is measured from a cross-sectional structure of the coated cutting tool using an optical microscope, a scanning electron microscope (SEM), a transmission electron microscope (TEM), or the like. The average thickness of each layer in the coated cutting tool of the present embodiment can be obtained by measuring the thickness of each layer from three or more cross sections in the vicinity of a position 50 μm from a cutting edge ridgeline portion of a surface facing the metal evaporation source toward a center portion of the surface and by calculating an average value (arithmetic mean value).

Further, the composition of each layer forming the coating layer in the coated cutting tool of the present embodiment can be measured from the cross-sectional structure of the coated cutting tool of the present embodiment by using an energy dispersive X-ray analyzer (EDS) or a wavelength dispersive X-ray analyzer (WDS).

It is considered that the coated cutting tool of the present embodiment has an effect that the tool life can be extended as compared with that in the related art because the coated cutting tool is excellent in at least wear resistance and fracture resistance (however, the factors that can extend the tool life are not limited to the above). Specific examples of types of the coated cutting tool of the present embodiment include an indexable cutting insert for milling or lathe processing, a drill, or an end mill.

EXAMPLES

Hereinafter, the invention will be described in more detail by way of Examples, but the present invention is not limited to these examples.

Example 1

As a substrate, a cemented carbide having a composition of 94.7% WC-5.0% Co-0.3% $Cr_3C_2$ (mass %) processed into an insert shape of CNMG120408-SM (manufactured by Tungaloy Corporation) was prepared. A metal evaporation source was arranged in the reaction vessel of the arc ion plating device so as to obtain the composition of the compound layer shown in Tables 1 to 3. The prepared substrate was fixed to a fixing bracket of a rotary table in the reaction vessel.

After that, the inside of the reaction vessel was evacuated until the pressure reached a vacuum of $5.0 \times 10^{-3}$ Pa or less. After evacuation, the substrate was heated to 450° C. with a heater in the reaction vessel. After heating, Ar gas was introduced into the reaction vessel so that the pressure became 2.7 Pa.

In the Ar gas atmosphere with a pressure of 2.7 Pa, a bias voltage of –400 V was applied to the substrate, a current of 40 A was passed through the tungsten filament in the reaction vessel, and the surface of the substrate was subjected to ion bombardment treatment with Ar gas for 30 min.

After the ion bombardment treatment was completed, the inside of the reaction vessel was evacuated until the pressure reached a vacuum of $5.0 \times 10^{-3}$ Pa or less.

For the invention samples 1 to 36 and the comparative samples 4 to 12, after vacuuming, the substrate was controlled so that the temperature thereof became such as shown in Tables 4 and 5 (the temperature at the start of film formation), nitrogen gas ($N_2$) was introduced into the reaction vessel, and the pressure inside the reaction vessel was adjusted to that shown in Tables 4 and 5. Then, the bias voltage shown in Tables 4 and 5 was applied to the substrate to alternately evaporate the metal evaporation sources of the second layer and the first layer having the composition shown in Tables 1 to 3 by the arc discharge of the arc current shown in Tables 4 and 5 in the order presented, and the second layer and the first layer were formed on the surface of the substrate in the order presented. At this time, the pressure in the reaction vessel was controlled to that shown in Tables 4 and 5. Further, the thicknesses of the first layer and the second layer were controlled by adjusting each arc discharge time so as to have the thicknesses shown in Tables 1 to 3. For the comparative samples 1 to 3, after vacuuming, the substrate was controlled so that the temperature thereof became such as shown in Table 5 (the temperature at the start of film formation), nitrogen gas ($N_2$) was introduced into the reaction vessel, and the pressure inside the reaction vessel was adjusted to that shown in Table 5. Then, the bias voltage shown in Table 5 was applied to the substrate to evaporate the metal evaporation source of the second layer having the composition shown in Table 3 by the arc discharge of the arc current shown in Table 5, and a single layer of the second layer was formed on the surface of the substrate. At this time, the pressure in the reaction vessel was controlled to that shown in Table 5. Further, the thickness of the second layer was controlled by adjusting the arc discharge time so as to have the thickness shown in Table 3.

After forming the compound layer on the surface of the substrate to the predetermined average thickness shown in Tables 1 to 3, the power of the heater was turned off, and after the sample temperature became 100° C. or lower, the sample was taken out from the reaction vessel.

An average thickness of the compound layer of the obtained sample was obtained by observing, using a TEM, three cross sections in the vicinity of a position 50 μm from a cutting edge ridgeline portion of a surface of the coated cutting tool facing the metal evaporation source toward a center portion of the surface, measuring the thickness of each layer, and calculating an average value (arithmetic mean value). The average thickness per layer of the first layer was calculated as a value obtained by dividing the total thickness which is the sum of the thicknesses of each first layer by the number of the first layers (number of repetitions). The average thickness per layer of the second layer was also calculated as a value obtained by dividing the total thickness which is the sum of the thicknesses of each second layer by the number of the second layers (number of repetitions). The results are shown in Tables 1 to 3.

The composition of each compound layer of the obtained sample was measured by using an EDS attached to the TEM in a cross section in the vicinity of the position 50 μm from the cutting edge ridgeline portion of the surface of the coated cutting tool facing the metal evaporation source toward the center portion. The composition difference |a-c| was calculated by obtaining the absolute value of the difference between a and c which was obtained by the measurement method. The results are also shown in Tables 1 to 3. Further, e and f values in the composition $(Al_eM_fTi_{1-e-f})N$ represented by the formula (3) in the entire compound of the alternately laminated structure were measured by using an EDS attached to the TEM. Specifically, the surface of the alternately laminated structure was analyzed in a cross section in the vicinity of the position 50 μm from the cutting edge ridgeline portion of the surface of the coated cutting tool facing the metal evaporation source toward the center portion. At this time, the measurement range was taken as "the length of 80% of the average thickness of the alternately laminated structure"ד"1 μm (the length in the direction substantially parallel to the substrate surface) or more". Each atomic ratio in the average composition $(Al_e M_f Ti_{1-e-f})N$ of the alternately laminated structure was obtained from the results of the surface analysis. The results are also shown in Table 1 to 3.

TABLE 1

| | First layer: $(Al_a M_b Ti_{1-a-b})N$ | | | | | Second layer: $(Al_c M_d Ti_{1-c-d})N$ | | | | | | | Average composition: $(Al_e M_f Ti_{1-e-f})N$ | | | | |
|---|---|---|---|---|---|---|---|---|---|---|---|---|---|---|---|---|---|
| Sample number | a | b | 1-a-b | M | Average thickness per layer (nm) | c | d | 1-c-d | M | Average thickness per layer (nm) | Number of repetitions | \|a-c\| | e | f | 1-e-f | M | Average thickness (μm) |
| Invention sample 1 | 0.85 | 0.04 | 0.11 | Nb | 25 | 0.85 | 0.02 | 0.13 | Nb | 25 | 60 | 0.00 | 0.85 | 0.03 | 0.12 | Nb | 3.0 |
| Invention sample 2 | 0.90 | 0.04 | 0.06 | Nb | 25 | 0.90 | 0.02 | 0.08 | Nb | 25 | 60 | 0.00 | 0.90 | 0.03 | 0.07 | Nb | 3.0 |
| Invention sample 3 | 0.80 | 0.04 | 0.16 | Nb | 25 | 0.80 | 0.02 | 0.18 | Nb | 25 | 60 | 0.00 | 0.80 | 0.03 | 0.17 | Nb | 3.0 |
| Invention sample 4 | 0.80 | 0.04 | 0.16 | Nb | 25 | 0.76 | 0.02 | 0.22 | Nb | 25 | 60 | 0.04 | 0.78 | 0.03 | 0.19 | Nb | 3.0 |
| Invention sample 5 | 0.76 | 0.06 | 0.18 | Nb | 25 | 0.80 | 0.00 | 0.2 | Nb | 25 | 60 | 0.04 | 0.78 | 0.03 | 0.19 | Nb | 3.0 |
| Invention sample 6 | 0.80 | 0.08 | 0.12 | Nb | 25 | 0.76 | 0.00 | 0.24 | Nb | 25 | 60 | 0.04 | 0.78 | 0.04 | 0.18 | Nb | 3.0 |
| Invention sample 7 | 0.85 | 0.08 | 0.07 | Nb | 25 | 0.85 | 0.00 | 0.15 | — | 25 | 60 | 0.00 | 0.85 | 0.04 | 0.11 | Nb | 3.0 |
| Invention sample 8 | 0.85 | 0.08 | 0.07 | Ta | 25 | 0.85 | 0.00 | 0.15 | — | 25 | 60 | 0.00 | 0.85 | 0.04 | 0.11 | Ta | 3.0 |
| Invention sample 9 | 0.90 | 0.04 | 0.06 | Ta | 25 | 0.90 | 0.02 | 0.08 | Ta | 25 | 60 | 0.00 | 0.90 | 0.03 | 0.07 | Ta | 3.0 |
| Invention sample 10 | 0.80 | 0.04 | 0.16 | Ta | 25 | 0.80 | 0.02 | 0.18 | Ta | 25 | 60 | 0.00 | 0.80 | 0.03 | 0.17 | Ta | 3.0 |
| Invention sample 11 | 0.81 | 0.04 | 0.15 | Ta | 25 | 0.75 | 0.02 | 0.23 | Ta | 25 | 60 | 0.06 | 0.78 | 0.03 | 0.19 | Ta | 3.0 |
| Invention sample 12 | 0.85 | 0.04 | 0.11 | Ta | 25 | 0.85 | 0.02 | 0.13 | Ta | 25 | 90 | 0.00 | 0.85 | 0.03 | 0.12 | Ta | 4.5 |
| Invention sample 13 | 0.85 | 0.04 | 0.11 | Ta | 25 | 0.85 | 0.02 | 0.13 | Ta | 25 | 20 | 0.00 | 0.85 | 0.03 | 0.12 | Ta | 1.0 |
| Invention sample 14 | 0.85 | 0.04 | 0.11 | Ta | 25 | 0.85 | 0.02 | 0.13 | Ta | 25 | 10 | 0.00 | 0.85 | 0.03 | 0.12 | Ta | 0.5 |
| Invention sample 15 | 0.80 | 0.06 | 0.14 | Ta | 25 | 0.80 | 0.12 | 0.08 | Ta | 25 | 60 | 0.00 | 0.80 | 0.09 | 0.11 | Ta | 3.0 |
| Invention sample 16 | 0.80 | 0.03 | 0.17 | Ta | 2 | 0.76 | 0.01 | 0.23 | Ta | 50 | 58 | 0.04 | 0.76 | 0.01 | 0.23 | Ta | 3.0 |

TABLE 2

| | First layer: $(Al_a M_b Ti_{1-a-b})N$ | | | | | Second layer: $(Al_c M_d Ti_{1-c-d})N$ | | | | | | | Average composition: $(Al_e M_f Ti_{1-e-f})N$ | | | | |
|---|---|---|---|---|---|---|---|---|---|---|---|---|---|---|---|---|---|
| Sample number | a | b | 1-a-b | M | Average thickness per layer (nm) | c | d | 1-c-d | M | Average thickness per layer (nm) | Number of repetitions | \|a-c\| | e | f | 1-e-f | M | Average thickness (μm) |
| Invention sample 17 | 0.85 | 0.06 | 0.09 | Nb | 25 | 0.85 | 0.02 | 0.13 | Ta | 25 | 80 | 0.00 | 0.85 | 0.04 | 0.11 | $Nb_{0.80}Ta_{0.20}$ | 4.0 |
| Invention sample 18 | 0.85 | 0.04 | 0.11 | Nb | 25 | 0.85 | 0.04 | 0.11 | Ta | 25 | 80 | 0.00 | 0.85 | 0.04 | 0.11 | $Nb_{0.60}Ta_{0.40}$ | 4.0 |
| Invention sample 19 | 0.85 | 0.04 | 0.11 | Nb | 25 | 0.85 | 0.06 | 0.09 | Ta | 25 | 80 | 0.00 | 0.85 | 0.05 | 0.10 | $Nb_{0.40}Ta_{0.60}$ | 4.0 |
| Invention sample 20 | 0.85 | 0.02 | 0.13 | Nb | 25 | 0.85 | 0.08 | 0.07 | Ta | 25 | 80 | 0.00 | 0.85 | 0.05 | 0.10 | $Nb_{0.20}Ta_{0.80}$ | 4.0 |
| Invention sample 21 | 0.90 | 0.06 | 0.04 | $Nb_{0.50}Ta_{0.50}$ | 25 | 0.80 | 0.02 | 0.18 | $Nb_{0.50}Ta_{0.50}$ | 25 | 80 | 0.10 | 0.85 | 0.04 | 0.11 | $Nb_{0.50}Ta_{0.50}$ | 4.0 |
| Invention sample 22 | 0.80 | 0.06 | 0.14 | $Nb_{0.50}Ta_{0.50}$ | 25 | 0.90 | 0.02 | 0.08 | $Nb_{0.50}Ta_{0.50}$ | 25 | 80 | 0.10 | 0.85 | 0.04 | 0.11 | $Nb_{0.50}Ta_{0.50}$ | 4.0 |
| Invention sample 23 | 0.85 | 0.04 | 0.11 | Nb | 25 | 0.85 | 0.02 | 0.13 | Nb | 25 | 100 | 0.00 | 0.85 | 0.03 | 0.12 | Nb | 5.0 |
| Invention sample 24 | 0.85 | 0.04 | 0.11 | Nb | 25 | 0.85 | 0.02 | 0.13 | Nb | 25 | 30 | 0.00 | 0.85 | 0.03 | 0.12 | Nb | 1.5 |
| Invention sample 25 | 0.85 | 0.04 | 0.11 | Nb | 25 | 0.85 | 0.02 | 0.13 | Nb | 25 | 10 | 0.00 | 0.85 | 0.03 | 0.12 | Nb | 0.5 |

TABLE 2-continued

| | First layer: $(Al_aM_bTi_{1-a-b})N$ | | | | | Second layer: $(Al_cM_dTi_{1-c-d})N$ | | | | | | | Average composition: $(Al_eM_fTi_{1-e-f})N$ | | | | |
|---|---|---|---|---|---|---|---|---|---|---|---|---|---|---|---|---|---|
| Sample number | a | b | 1-a-b | M | Average thickness per layer (nm) | c | d | 1-c-d | M | Average thickness per layer (nm) | Number of repetitions | \|a-c\| | e | f | 1-e-f | M | Average thickness (μm) |
| Invention sample 26 | 0.80 | 0.16 | 0.04 | Nb | 25 | 0.80 | 0.08 | 0.12 | Nb | 25 | 60 | 0.00 | 0.80 | 0.12 | 0.08 | Nb | 3.0 |
| Invention sample 27 | 0.80 | 0.10 | 0.10 | Nb | 25 | 0.80 | 0.08 | 0.12 | Nb | 25 | 60 | 0.00 | 0.80 | 0.09 | 0.11 | Nb | 3.0 |
| Invention sample 28 | 0.80 | 0.02 | 0.18 | Nb | 25 | 0.80 | 0.00 | 0.20 | — | 25 | 60 | 0.00 | 0.80 | 0.01 | 0.19 | Nb | 3.0 |
| Invention sample 29 | 0.85 | 0.02 | 0.13 | Nb | 50 | 0.85 | 0.00 | 0.15 | — | 2 | 58 | 0.00 | 0.85 | 0.02 | 0.13 | Nb | 3.0 |
| Invention sample 30 | 0.85 | 0.04 | 0.11 | Nb | 100 | 0.85 | 0.02 | 0.13 | Nb | 100 | 15 | 0.00 | 0.85 | 0.03 | 0.12 | Nb | 3.0 |
| Invention sample 31 | 0.85 | 0.04 | 0.11 | Nb | 50 | 0.85 | 0.02 | 0.13 | Nb | 50 | 30 | 0.00 | 0.85 | 0.03 | 0.12 | Nb | 3.0 |
| Invention sample 32 | 0.85 | 0.04 | 0.11 | Nb | 5 | 0.85 | 0.02 | 0.13 | Nb | 5 | 300 | 0.00 | 0.85 | 0.03 | 0.12 | Nb | 3.0 |
| Invention sample 33 | 0.85 | 0.04 | 0.11 | Nb | 2 | 0.85 | 0.02 | 0.13 | Nb | 2 | 750 | 0.00 | 0.85 | 0.03 | 0.12 | Nb | 3.0 |
| Invention sample 34 | 0.84 | 0.04 | 0.12 | Nb | 30 | 0.78 | 0.02 | 0.20 | Nb | 30 | 50 | 0.06 | 0.81 | 0.03 | 0.16 | Nb | 3.0 |
| Invention sample 35 | 0.84 | 0.08 | 0.08 | Nb | 20 | 0.79 | 0.03 | 0.18 | Nb | 30 | 60 | 0.05 | 0.81 | 0.05 | 0.14 | Nb | 3.0 |
| Invention sample 36 | 0.82 | 0.04 | 0.14 | Nb | 25 | 0.80 | 0.02 | 0.18 | Nb | 25 | 60 | 0.02 | 0.81 | 0.03 | 0.16 | Nb | 3.0 |

TABLE 3

Coating layer
Alternately laminated structure

| | First layer: $(Al_aM_bTi_{1-a-b})N$ | | | | | Second layer: $(Al_cM_dTi_{1-c-d})N$ | | | | | | | Average composition: $(Al_eM_fTi_{1-e-f})N$ | | | | |
|---|---|---|---|---|---|---|---|---|---|---|---|---|---|---|---|---|---|
| Sample number | a | b | 1-a-b | M | Average thickness per layer (nm) | c | d | 1-c-d | M | Average thickness per layer (nm) | Number of repetitions | \|a-c\| | e | f | 1-e-f | M | Average thickness (μm) |
| Comparative sample 1 | — | — | — | — | — | 0.85 | 0.10 | 0.05 | Nb | 3000 | 1 | — | 0.85 | 0.10 | 0.05 | Nb | 3.0 |
| Comparative sample 2 | — | — | — | — | — | 0.85 | 0.05 | 0.10 | Nb | 3000 | 1 | — | 0.85 | 0.05 | 0.10 | Nb | 3.0 |
| Comparative sample 3 | — | — | — | — | — | 0.85 | 0.00 | 0.15 | — | 3000 | 1 | — | 0.85 | 0.00 | 0.15 | — | 3.0 |
| Comparative sample 4 | 0.80 | 0.00 | 0.20 | — | 25 | 0.84 | 0.00 | 0.16 | — | 25 | 60 | 0.04 | 0.82 | 0.00 | 0.18 | — | 3.0 |
| Comparative sample 5 | 0.78 | 0.04 | 0.18 | Nb | 500 | 0.78 | 0.02 | 0.20 | Nb | 500 | 3 | 0.00 | 0.78 | 0.03 | 0.19 | Nb | 3.0 |
| Comparative sample 6 | 0.85 | 0.04 | 0.11 | Nb | 25 | 0.85 | 0.02 | 0.13 | Nb | 25 | 140 | 0.00 | 0.85 | 0.03 | 0.12 | Nb | 7.0 |
| Comparative sample 7 | 0.85 | 0.04 | 0.11 | Nb | 25 | 0.85 | 0.02 | 0.13 | Nb | 25 | 4 | 0.00 | 0.85 | 0.03 | 0.12 | Nb | 0.2 |
| Comparative sample 8 | 0.92 | 0.04 | 0.04 | Nb | 25 | 0.92 | 0.02 | 0.06 | Nb | 25 | 60 | 0.00 | 0.92 | 0.03 | 0.05 | Nb | 3.0 |
| Comparative sample 9 | 0.88 | 0.04 | 0.08 | Nb | 25 | 0.92 | 0.02 | 0.06 | Nb | 25 | 60 | 0.04 | 0.90 | 0.03 | 0.07 | Nb | 3.0 |
| Comparative sample 10 | 0.78 | 0.04 | 0.18 | Nb | 25 | 0.78 | 0.02 | 0.20 | Nb | 25 | 60 | 0.00 | 0.78 | 0.03 | 0.19 | Nb | 3.0 |
| Comparative sample 11 | 0.93 | 0.04 | 0.03 | Nb | 25 | 0.75 | 0.00 | 0.25 | — | 25 | 60 | 0.18 | 0.84 | 0.02 | 0.14 | Nb | 3.0 |
| Comparative sample 12 | 0.85 | 0.12 | 0.03 | Ta | 25 | 0.75 | 0.22 | 0.03 | Ta | 25 | 60 | 0.10 | 0.80 | 0.17 | 0.03 | Ta | 3.0 |

TABLE 4

| | First layer | | | | Second layer | | | |
|---|---|---|---|---|---|---|---|---|
| Sample number | Temper-ature (° C.) | Voltage (V) | Current (A) | Pressure (Pa) | Temper-ature (° C.) | Voltage (V) | Current (A) | Pressure (Pa) |
| Invention sample 1 | 250 | −300 | 100 | 10 | 250 | −300 | 100 | 10 |
| Invention sample 2 | 200 | −400 | 100 | 12 | 200 | −400 | 100 | 12 |
| Invention sample 3 | 300 | −300 | 100 | 8 | 300 | −300 | 100 | 8 |
| Invention sample 4 | 300 | −300 | 100 | 10 | 300 | −300 | 100 | 10 |
| Invention sample 5 | 300 | −300 | 100 | 10 | 300 | −300 | 100 | 10 |
| Invention sample 6 | 300 | −300 | 100 | 10 | 300 | −300 | 100 | 10 |
| Invention sample 7 | 250 | −400 | 100 | 12 | 250 | −300 | 100 | 12 |
| Invention sample 8 | 250 | −400 | 100 | 10 | 250 | −300 | 100 | 10 |
| Invention sample 9 | 200 | −400 | 100 | 12 | 200 | −400 | 100 | 12 |
| Invention sample 10 | 300 | −300 | 100 | 8 | 300 | −300 | 100 | 8 |
| Invention sample 11 | 300 | −300 | 100 | 10 | 300 | −300 | 100 | 10 |
| Invention sample 12 | 300 | −300 | 100 | 12 | 300 | −300 | 100 | 12 |
| Invention sample 13 | 250 | −300 | 100 | 10 | 250 | −300 | 100 | 10 |
| Invention sample 14 | 200 | −400 | 100 | 8 | 200 | −400 | 100 | 8 |
| Invention sample 15 | 300 | −300 | 100 | 12 | 300 | −300 | 100 | 12 |
| Invention sample 16 | 300 | −300 | 80 | 10 | 300 | −300 | 120 | 10 |
| Invention sample 17 | 250 | −300 | 100 | 10 | 250 | −300 | 100 | 10 |
| Invention sample 18 | 250 | −300 | 100 | 10 | 250 | −300 | 100 | 10 |
| Invention sample 19 | 250 | −300 | 100 | 10 | 250 | −300 | 100 | 10 |
| Invention sample 20 | 250 | −300 | 100 | 10 | 250 | −300 | 100 | 10 |
| Invention sample 21 | 250 | −400 | 100 | 12 | 250 | −300 | 100 | 12 |
| Invention sample 22 | 250 | −300 | 100 | 12 | 250 | −400 | 100 | 12 |
| Invention sample 23 | 300 | −300 | 100 | 12 | 300 | −300 | 100 | 12 |
| Invention sample 24 | 250 | −300 | 100 | 10 | 250 | −300 | 100 | 10 |
| Invention sample 25 | 200 | −400 | 100 | 8 | 200 | −400 | 100 | 8 |
| Invention sample 26 | 300 | −300 | 100 | 12 | 300 | −300 | 100 | 12 |
| Invention sample 27 | 300 | −300 | 100 | 12 | 300 | −300 | 100 | 12 |
| Invention sample 28 | 300 | −300 | 100 | 12 | 300 | −300 | 100 | 12 |
| Invention sample 29 | 300 | −300 | 120 | 10 | 300 | −300 | 80 | 10 |
| Invention sample 30 | 300 | −300 | 120 | 10 | 300 | −300 | 120 | 10 |
| Invention sample 31 | 250 | −400 | 110 | 10 | 250 | −400 | 110 | 10 |
| Invention sample 32 | 200 | −300 | 90 | 10 | 200 | −300 | 90 | 10 |
| Invention sample 33 | 200 | −300 | 80 | 12 | 200 | −300 | 80 | 12 |
| Invention sample 34 | 300 | −300 | 100 | 10 | 300 | −300 | 100 | 10 |
| Invention sample 35 | 300 | −300 | 100 | 10 | 300 | −300 | 100 | 10 |
| Invention sample 36 | 300 | −300 | 100 | 10 | 300 | −300 | 100 | 10 |

TABLE 5

| | First layer | | | | Second layer | | | |
|---|---|---|---|---|---|---|---|---|
| Sample number | Temperature (° C.) | Voltage (V) | Current (A) | Pressure (Pa) | Temperature (° C.) | Voltage (V) | Current (A) | Pressure (Pa) |
| Comparative sample 1 | — | — | — | — | 250 | −300 | 100 | 12 |
| Comparative sample 2 | — | — | — | — | 250 | −300 | 100 | 10 |
| Comparative sample 3 | — | — | — | — | 250 | −300 | 100 | 8 |
| Comparative sample 4 | 250 | −300 | 100 | 8 | 250 | −300 | 100 | 8 |
| Comparative sample 5 | 350 | −40 | 100 | 5 | 600 | −40 | 100 | 5 |
| Comparative sample 6 | 300 | −200 | 100 | 12 | 300 | −200 | 100 | 12 |
| Comparative sample 7 | 200 | −400 | 100 | 8 | 200 | −400 | 100 | 8 |
| Comparative sample 8 | 200 | −300 | 100 | 12 | 200 | −300 | 100 | 12 |
| Comparative sample 9 | 200 | −300 | 100 | 12 | 200 | −300 | 100 | 12 |
| Comparative sample 10 | 300 | −300 | 100 | 8 | 300 | −300 | 100 | 8 |
| Comparative sample 11 | 300 | −200 | 100 | 8 | 300 | −200 | 100 | 8 |
| Comparative sample 12 | 300 | −300 | 100 | 10 | 300 | −300 | 100 | 10 |

The ratio $I_{hex}/I_{cub}$ in the alternately laminated structure of the obtained sample was measured by using a model: RINT TTR III, which is an X-ray diffractometer manufactured by Rigaku Corporation. Specifically, the ratio $I_{hex}/I_{cub}$ was calculated by measuring the peak intensity of the cubic crystal (200) plane of the alternately laminated structure, the peak intensity of the cubic crystal (111) plane of the alternately laminated structure, the peak intensity of the hexagonal crystal (110) plane of the alternately laminated structure, the peak intensity of the hexagonal crystal (100) plane of the alternately laminated structure by X-ray diffraction measurement with a 2θ/θ focused optical system using Cu-Kα rays under the conditions of output: 50 kV, 250 mA, incident side solar slit: 5°, divergent vertical slit: 2/3°, divergent vertical limiting slit: 5 mm, scattering slit: 2/3°, light receiving side solar slit: 5°, light receiving slit: 0.3 mm, BENT monochromator, light receiving monochrome slit: 0.8 mm, sampling width: 0.01°, scan speed: 4°/min, and 2θ measurement range: 20° to 70° and calculating the sum of diffraction peak intensities of the cubic crystal (111) plane and the cubic crystal (200) plane denoted by $I_{cub}$, and the sum of diffraction peak intensities of the hexagonal crystal (110) plane and the hexagonal crystal (100) plane denoted by $I_{hex}$. The results are shown in Tables 6 and 7. When obtaining the above peak intensity of each plane index from the X-ray diffraction pattern, the analysis software provided with the X-ray diffractometer was used. In the analysis software, each peak intensity was obtained by performing background processing and Kα2 peak removal using a cubic approximation, and performing profile fitting using the Pearson-VII function. Peaks of each plane in the X-ray diffraction profile obtained by the profile fitting had peak tops within the following ranges.

Peak of cubic crystal (111) plane: 37.0° or more and 37.8° or less

Peak of cubic crystal (200) plane: 43.0° or more and 43.9° or less

Peak of hexagonal crystal (100) plane: 32.0° or more and 32.9° or less

Peak of hexagonal crystal (110) plane: 56.8° or more and 58.7° or less

Further, the crystal system of the alternately laminated structure was also confirmed by X-ray diffraction measurement. More specifically, the peak intensities of the cubic crystal (200) plane, the cubic crystal (111) plane, the hexagonal crystal (110) plane, and the hexagonal crystal (100) plane of the alternately laminated structure were measured as the measurement objects. At this time, the peaks of the first layer and the peaks of the second layer were not separated, and the peak intensity including both reflections was obtained. For convenience, the above ratio $I_{hex}/I_{cub}$ was calculated from the peak intensities thus obtained, and taken as $I_{hex}/I_{cub}$ of the alternately laminated structure.

TABLE 6

| Sample number | Alternately laminated structure $I_{hex}/I_{cub}$ |
| --- | --- |
| Invention sample 1 | 0.06 |
| Invention sample 2 | 0.40 |
| Invention sample 3 | 0.00 |
| Invention sample 4 | 0.00 |
| Invention sample 5 | 0.00 |
| Invention sample 6 | 0.00 |
| Invention sample 7 | 0.08 |

TABLE 6-continued

| Sample number | Alternately laminated structure $I_{hex}/I_{cub}$ |
| --- | --- |
| Invention sample 8 | 0.10 |
| Invention sample 9 | 0.48 |
| Invention sample 10 | 0.00 |
| Invention sample 11 | 0.00 |
| Invention sample 12 | 0.38 |
| Invention sample 13 | 0.00 |
| Invention sample 14 | 0.00 |
| Invention sample 15 | 0.00 |
| Invention sample 16 | 0.00 |
| Invention sample 17 | 0.15 |
| Invention sample 18 | 0.18 |
| Invention sample 19 | 0.22 |
| Invention sample 20 | 0.28 |
| Invention sample 21 | 0.20 |
| Invention sample 22 | 0.26 |
| Invention sample 23 | 0.34 |
| Invention sample 24 | 0.00 |
| Invention sample 25 | 0.00 |
| Invention sample 26 | 0.00 |
| Invention sample 27 | 0.00 |
| Invention sample 28 | 0.00 |
| Invention sample 29 | 0.18 |
| Invention sample 30 | 0.24 |
| Invention sample 31 | 0.15 |
| Invention sample 32 | 0.05 |
| Invention sample 33 | 0.08 |
| Invention sample 34 | 0.00 |
| Invention sample 35 | 0.00 |
| Invention sample 36 | 0.00 |

TABLE 7

| Sample number | Alternately laminated structure $I_{hex}/I_{cub}$ |
| --- | --- |
| Comparative sample 1 | 0.00 |
| Comparative sample 2 | 0.12 |
| Comparative sample 3 | 0.38 |
| Comparative sample 4 | 0.26 |
| Comparative sample 5 | 0.34 |
| Comparative sample 6 | 0.39 |
| Comparative sample 7 | 0.02 |
| Comparative sample 8 | 0.59 |
| Comparative sample 9 | 0.50 |
| Comparative sample 10 | 0.00 |
| Comparative sample 11 | 0.30 |
| Comparative sample 12 | 0.00 |

By using the obtained samples, the following cutting test was performed, and the results thereof were evaluated.

Cutting Test

Work material: SUS329J4L,

Work material shape: round bar with four grooves at equal intervals on the outer peripheral surface, Cutting speed: 120 m/min, Feed: 0.15 mm/rev, Depth of cut: 0.5 mm, Coolant: water-soluble coolant, Evaluation items: The tool life end was determined by the timing when sample was fractured, and the number of impacts until the tool life end was measured. It means that the higher the number of impacts until the tool life end is, the more excellent the fracture resistance and the wear resistance are.

The results of the obtained evaluation are shown in Tables 8 and 9.

TABLE 8

| Sample number | Tool life (number of impacts) |
|---|---|
| Invention sample 1 | 920 |
| Invention sample 2 | 580 |
| Invention sample 3 | 700 |
| Invention sample 4 | 480 |
| Invention sample 5 | 580 |
| Invention sample 6 | 560 |
| Invention sample 7 | 980 |
| Invention sample 8 | 780 |
| Invention sample 9 | 440 |
| Invention sample 10 | 620 |
| Invention sample 11 | 440 |
| Invention sample 12 | 780 |
| Invention sample 13 | 500 |
| Invention sample 14 | 400 |
| Invention sample 15 | 480 |
| Invention sample 16 | 380 |
| Invention sample 17 | 840 |
| Invention sample 18 | 780 |
| Invention sample 19 | 700 |
| Invention sample 20 | 560 |
| Invention sample 21 | 700 |
| Invention sample 22 | 620 |
| Invention sample 23 | 840 |
| Invention sample 24 | 700 |
| Invention sample 25 | 380 |
| Invention sample 26 | 440 |
| Invention sample 27 | 560 |
| Invention sample 28 | 700 |
| Invention sample 29 | 560 |
| Invention sample 30 | 560 |
| Invention sample 31 | 780 |
| Invention sample 32 | 840 |
| Invention sample 33 | 700 |
| Invention sample 34 | 560 |
| Invention sample 35 | 640 |
| Invention sample 36 | 840 |

TABLE 9

| Sample number | Tool life (number of impacts) |
|---|---|
| Comparative sample 1 | 160 |
| Comparative sample 2 | 120 |
| Comparative sample 3 | 80 |
| Comparative sample 4 | 200 |
| Comparative sample 5 | 240 |
| Comparative sample 6 | 220 |
| Comparative sample 7 | 280 |
| Comparative sample 8 | 240 |
| Comparative sample 9 | 280 |
| Comparative sample 10 | 320 |
| Comparative sample 11 | 240 |
| Comparative sample 12 | 300 |

It was found from the results shown in Tables 8 and 9 that the invention samples in which the coated cutting tool included a substrate and a coating layer formed on the surface of the substrate, the coating layer had an alternately laminated structure having first layers and second layers alternately laminated in two or more layers, respectively, the first layer was a compound layer satisfying the formula (1), the second layer was a compound layer satisfying the formula (2), at least one of a in the formula (1) and c in the formula (2) was 0.80 or more, and an average thickness of the alternately laminated structure was 0.5 μm or more and 5.0 μm or less had more excellent fracture resistance and wear resistance than the comparative samples, and had a long tool life.

Example 2

As a substrate, a cemented carbide having a composition of 94.7% WC-5.0% Co-0.3% $Cr_3C_2$ (mass %) processed into an insert shape of CNMG120408-SM (manufactured by Tungaloy Corporation) was prepared. A predetermined metal evaporation source was arranged in the reaction vessel of the arc ion plating device. The prepared substrate was fixed to a fixing bracket of a rotary table in the reaction vessel.

After that, the inside of the reaction vessel was evacuated until the pressure reached a vacuum of $5.0 \times 10^{-3}$ Pa or less. After evacuation, the substrate was heated to 450° C. with a heater in the reaction vessel. After heating, Ar gas was introduced into the reaction vessel so that the pressure became 2.7 Pa.

In the Ar gas atmosphere with a pressure of 2.7 Pa, a bias voltage of −400 V was applied to the substrate, a current of 40 A was passed through the tungsten filament in the reaction vessel, and the surface of the substrate was subjected to ion bombardment treatment with Ar gas for 30 min. After the ion bombardment treatment was completed, the inside of the reaction vessel was evacuated until the pressure reached a vacuum of $5.0 \times 10^{-3}$ Pa or less.

For the invention samples 37 to 41, after vacuuming, the substrate was controlled until the temperature thereof became such as shown in Table 11 (the temperature at the start of film formation), $N_2$ gas was introduced into the reaction vessel, and the pressure inside the reaction vessel was adjusted to that shown in Table 11. Then, the bias voltage shown in Table 11 was applied to the substrate to evaporate the metal evaporation source corresponding to the composition of the lower layer shown in Table 10 by the arc discharge of the arc current shown in Table 11 to form a lower layer.

The second layer and the first layer were alternately formed on the surface of the lower layer or on the substrate to form an alternately laminated structure under the same manufacturing conditions of the alternately laminated structure as those of the invention sample 1 for the invention sample 37, the invention sample 2 for the invention sample 38, the invention sample 25 for the invention sample 39, the invention sample 23 for the invention sample 40, the invention sample 7 for the invention sample 41, the invention sample 8 for the invention sample 42, the invention sample 12 for the invention sample 43, and the invention sample 13 for the invention sample 44.

Then, for the invention samples 40 to 44, after vacuuming, the substrate was controlled until the temperature thereof became such as shown in Table 11 (the temperature at the start of film formation), $N_2$ gas was introduced into the reaction vessel, and the pressure inside the reaction vessel was adjusted to that shown in Table 11. Then, the bias voltage shown in Table 11 was applied to the substrate to evaporate the metal evaporation source corresponding to the composition of the upper layer shown in Table 10 by the arc discharge of the arc current shown in Table 11 to form an upper layer. After forming each layer on the surface of the substrate to the predetermined average thickness shown in Table 10, the power of the heater was turned off, and after the sample temperature became 100° C. or lower, the sample was taken out from the reaction vessel.

The average thickness and composition of each layer, the ratio $I_{hex}/I_{cub}$ in the alternately laminated structure, and the residual stress of the obtained samples were measured and calculated in the same manner as in Example 1. The results are shown in Table 12. In the measurement, the peaks of the alternately laminated structure were specified by the following methods (i) to (iii).

(i) When the coating layer includes the upper layer, the peaks of the alternately laminated structure were specified by removing the upper layer by buffing.

(ii) When the coating layer includes the lower layer, the peaks of the alternately laminated structure were specified by a thin-film X-ray diffraction method so as not to be affected by the lower layer.

(iii) When the coating layer includes the upper layer and the lower layer, the peaks of the alternately laminated structure were specified by combining the above (i) and (ii).

TABLE 10

| Sample number | Lower layer | | Coating layer | | | | | | | | | | | | | | | | | | | Upper layer | | Total |
| | | | Alternately laminated structure | | | | | | | | | | | | | | | | | | | | | |
| | | | First layer: $(Al_aM_bTi_{1-a-b})N$ | | | | | Second layer: $(Al_cM_dTi_{1-c-d})N$ | | | | | Number of repetitions | Average composition: $(Al_eM_fTi_{1-e-f})N$ | | | | | | | | | |
| | Composition | Average thickness (µm) | a | b | 1-a-b | M | Average thickness per layer (nm) | c | d | 1-c-d | M | Average thickness per layer (nm) | | \|a-c\| | e | f | 1-e-f | 5 | Average thickness (µm) | Composition | Average thickness (µm) | average thickness (µm) |
| Invention sample 37 | $Ti_{0.33}Al_{0.67}N$ | 0.5 | 0.85 | 0.04 | 0.11 | Nb | 25 | 0.85 | 0.02 | 0.13 | Nb | 25 | 60 | 0.00 | 0.85 | 0.03 | 0.12 | Nb | 3.0 | — | — | 3.5 |
| Invention sample 38 | CrN | 1.0 | 0.90 | 0.04 | 0.06 | Nb | 25 | 0.9 | 0.02 | 0.08 | Nb | 25 | 60 | 0.00 | 0.90 | 0.03 | 0.07 | Nb | 3.0 | — | — | 5.0 |
| Invention sample 39 | $TiC_{0.05}N_{0.95}$ | 0.2 | 0.85 | 0.04 | 0.11 | Nb | 25 | 0.85 | 0.02 | 0.13 | Nb | 25 | 10 | 0.00 | 0.85 | 0.03 | 0.12 | Nb | 0.5 | — | — | 0.7 |
| Invention sample 40 | $Ti_{0.50}Al_{0.50}N$ | 2.0 | 0.85 | 0.04 | 0.11 | Nb | 25 | 0.85 | 0.02 | 0.13 | Nb | 25 | 100 | 0.00 | 0.85 | 0.03 | 0.12 | Nb | 5.0 | $Ti_{0.5}Al_{0.5}N$ | 2.0 | 9.0 |
| Invention sample 41 | $Ti_{0.30}Al_{0.60}Si_{0.10}N$ | 0.5 | 0.85 | 0.08 | 0.07 | Nb | 25 | 0.85 | — | 0.15 | Nb | 25 | 60 | 0.00 | 0.85 | 0.04 | 0.11 | Nb | 3.0 | TiN | 0.5 | 4.0 |
| Invention sample 42 | — | — | 0.85 | 0.08 | 0.07 | Ta | 25 | 0.85 | — | 0.15 | — | 25 | 60 | 0.00 | 0.85 | 0.04 | 0.11 | Ta | 3.0 | $Ti_{0.80}Si_{0.20}N$ | 0.5 | 3.5 |
| Invention sample 43 | — | — | 0.85 | 0.04 | 0.11 | Ta | 25 | 0.85 | 0.02 | 0.13 | Ta | 25 | 90 | 0.00 | 0.85 | 0.03 | 0.12 | Ta | 4.5 | $Ti_{0.90}Mo_{0.10}N$ | 0.2 | 4.7 |
| Invention sample 44 | — | — | 0.85 | 0.04 | 0.11 | Ta | 25 | 0.85 | 0.02 | 0.13 | Ta | 25 | 20 | 0.00 | 0.85 | 0.03 | 0.12 | Ta | 1.0 | NbN | 1.0 | 2.0 |

TABLE 11

| Sample number | Lower layer | | | | Upper layer | | | |
|---|---|---|---|---|---|---|---|---|
| | Temperature (° C.) | Voltage (V) | Current (A) | Pressure (Pa) | Temperature (° C.) | Voltage (V) | Current (A) | Pressure (Pa) |
| Invention sample 37 | 300 | −200 | 100 | 5 | — | — | — | — |
| Invention sample 38 | 500 | −200 | 100 | 3 | — | — | — | — |
| Invention sample 39 | 250 | −100 | 100 | 8 | — | — | — | — |
| Invention sample 40 | 300 | −40 | 100 | 5 | 300 | −40 | 100 | 5 |
| Invention sample 41 | 300 | −80 | 100 | 5 | 250 | −40 | 100 | 3 |
| Invention sample 42 | — | — | — | — | 250 | −100 | 100 | 8 |
| Invention sample 43 | — | — | — | — | 250 | −100 | 100 | 3 |
| Invention sample 44 | — | — | — | — | 250 | −200 | 100 | 8 |

TABLE 12

| Sample number | Alternately laminated structure $I_{hex}/I_{cub}$ |
|---|---|
| Invention sample 37 | 0.05 |
| Invention sample 38 | 0.36 |
| Invention sample 39 | 0.00 |
| Invention sample 40 | 0.25 |
| Invention sample 41 | 0.04 |
| Invention sample 42 | 0.10 |
| Invention sample 43 | 0.38 |
| Invention sample 44 | 0.00 |

By using the obtained samples, the cutting test was performed in the same manner as in Example 1, and the invention samples were evaluated. The results are shown in Table 13.

TABLE 13

| Sample number | Tool life (number of impacts) |
|---|---|
| Invention sample 37 | 940 |
| Invention sample 38 | 620 |
| Invention sample 39 | 460 |
| Invention sample 40 | 880 |
| Invention sample 41 | 1020 |
| Invention sample 42 | 800 |
| Invention sample 43 | 800 |
| Invention sample 44 | 520 |

It was found from the results shown in Table 13 that the invention samples in which the coated cutting tool included a substrate and a coating layer formed on the surface of the substrate, the coating layer had an alternately laminated structure having first layers and second layers alternately laminated in two or more layers, respectively, the first layer was a compound layer satisfying the formula (1), the second layer was a compound layer satisfying the formula (2), at least one of a in the formula (1) and c in the formula (2) was 0.80 or more, and an average thickness of the alternately laminated structure was 0.5 μm or more and 5.0 μm or less, and which further had at least one of the lower layer and the upper layer had more excellent fracture resistance and wear resistance, and a further long tool life.

INDUSTRIAL APPLICABILITY

Since the coated cutting tool of the invention has excellent wear resistance and fracture resistance, the tool life can be extended as compared with that in the related art. Therefore, the coated cutting tool has high industrial applicability in this respect.

REFERENCE SIGNS LIST

1: Coated cutting tool, 2: Substrate, 3: Coating layer, 4: Alternately laminated structure, 41: First layer, 42: Second layer, 5: Lower layer, 6: Upper layer.

What is claimed is:

1. A coated cutting tool comprising a substrate and a coating layer formed on the substrate, wherein, the coating layer comprises an alternately laminated structure of a first layer and a second layer;

the first layer contains a compound having a composition represented by a following formula (1):

$$(Al_aM_bTi_{1-a-b})N \tag{1}$$

wherein M represents at least one of a Nb element and a Ta element; a is an atomic ratio of an Al element to a total of the Al element, an element represented by M, and a Ti element, and satisfies $0.75 \le a \le 0.90$, and b is an atomic ratio of the element represented by M to the total of the Al element, the element represented by M, and the Ti element, and satisfies $0.00 < b \le 0.20$;

the second layer contains a compound having a composition represented by a following formula (2), the compound contained in the second layer being different from the compound contained in the first layer:

$$(Al_cM_dTi_{1-c-d})N \tag{2}$$

wherein M represents at least one of a Nb element and a Ta element; c is an atomic ratio of an Al element to a total of the Al element, an element represented by M, and a Ti element, and satisfies $0.75 \le c \le 0.90$; and d is an atomic ratio of the element represented by M to the total of the Al element, the element represented by M, and the Ti element, and satisfies $0.00 \le d \le 0.20$;

at least one of a and c is 0.80 or more; and an average thickness of the alternately laminated structure is 0.5 μm or more and 5.0 μm or less.

2. The coated cutting tool according to claim 1, wherein a sum of diffraction peak intensities of a cubic crystal (111) plane and a cubic crystal (200) plane is denoted by $I_{cub}$ and a sum of diffraction peak intensities of a hexagonal crystal (110) plane and a hexagonal crystal (100) plane is denoted by $I_{hex}$ in X-ray diffraction of the alternately laminated structure, $I_{hex}/I_{cub}$ is 0.00 or more and 0.40 or less.

3. The coated cutting tool according to claim 1, wherein an average composition of the entire compound of the alternately laminated structure is represented by a following formula (3):

$$(Al_e M_f Ti_{1-e-f})N \qquad (3)$$

wherein M represents at least one of a Nb element and a Ta element, e is an atomic ratio of an Al element to a total of the Al element, an element represented by M, and a Ti element, and satisfies $0.80 \leq e \leq 0.90$; and f is an atomic ratio of the element represented by M to the total of the Al element, the element represented by M, and the Ti element.

4. The coated cutting tool according to claim 3, wherein f satisfies $0.00 < f \leq 0.10$ in the formula (3).

5. The coated cutting tool according to claim 1, wherein a and c satisfy $0.00 \leq |a-c| \leq 0.05$.

6. The coated cutting tool according to claim 1, wherein an average thickness per layer of the first layer is 2 nm or more and 50 nm or less; and an average thickness per layer of the second layer is 2 nm or more and 50 nm or less.

7. The coated cutting tool according to claim 2, wherein an average composition of the entire compound of the alternately laminated structure is represented by a following formula (3):

$$(Al_e M_f Ti_{1-e-f})N \qquad (3)$$

wherein M represents at least one of a Nb element and a Ta element, e is an atomic ratio of an Al element to a total of the Al element, an element represented by M, and a Ti element, and satisfies $0.80 \leq e \leq 0.90$; and f is an atomic ratio of the element represented by M to the total of the Al element, the element represented by M, and the Ti element.

8. The coated cutting tool according to claim 7, wherein f satisfies $0.00 < f \leq 0.10$ in the formula (3).

9. The coated cutting tool according to claim 2, wherein a and c satisfy $0.00 \leq |a-c| \leq 0.05$.

10. The coated cutting tool according to claim 3, wherein a and c satisfy $0.00 \leq |a-c| \leq 0.05$.

11. The coated cutting tool according to claim 4, wherein a and c satisfy $0.00 \leq |a-c| \leq 0.05$.

12. The coated cutting tool according to claim 7, wherein a and c satisfy $0.00 \leq |a-c| \leq 0.05$.

13. The coated cutting tool according to claim 8, wherein a and c satisfy $0.00 \leq |a-c| \leq 0.05$.

14. The coated cutting tool according to claim 2, wherein an average thickness per layer of the first layer is 2 nm or more and 50 nm or less; and an average thickness per layer of the second layer is 2 nm or more and 50 nm or less.

15. The coated cutting tool according to claim 3, wherein an average thickness per layer of the first layer is 2 nm or more and 50 nm or less; and an average thickness per layer of the second layer is 2 nm or more and 50 nm or less.

16. The coated cutting tool according to claim 4, wherein an average thickness per layer of the first layer is 2 nm or more and 50 nm or less; and an average thickness per layer of the second layer is 2 nm or more and 50 nm or less.

17. The coated cutting tool according to claim 5, wherein an average thickness per layer of the first layer is 2 nm or more and 50 nm or less; and an average thickness per layer of the second layer is 2 nm or more and 50 nm or less.

18. The coated cutting tool according to claim 7, wherein an average thickness per layer of the first layer is 2 nm or more and 50 nm or less; and an average thickness per layer of the second layer is 2 nm or more and 50 nm or less.

19. The coated cutting tool according to claim 8, wherein an average thickness per layer of the first layer is 2 nm or more and 50 nm or less; and an average thickness per layer of the second layer is 2 nm or more and 50 nm or less.

20. The coated cutting tool according to claim 9, wherein an average thickness per layer of the first layer is 2 nm or more and 50 nm or less; and an average thickness per layer of the second layer is 2 nm or more and 50 nm or less.

* * * * *